Oct. 16, 1951   A. M. HOWALD ET AL   2,571,717
SHAFT FOR FISHING RODS
Filed Feb. 16, 1946
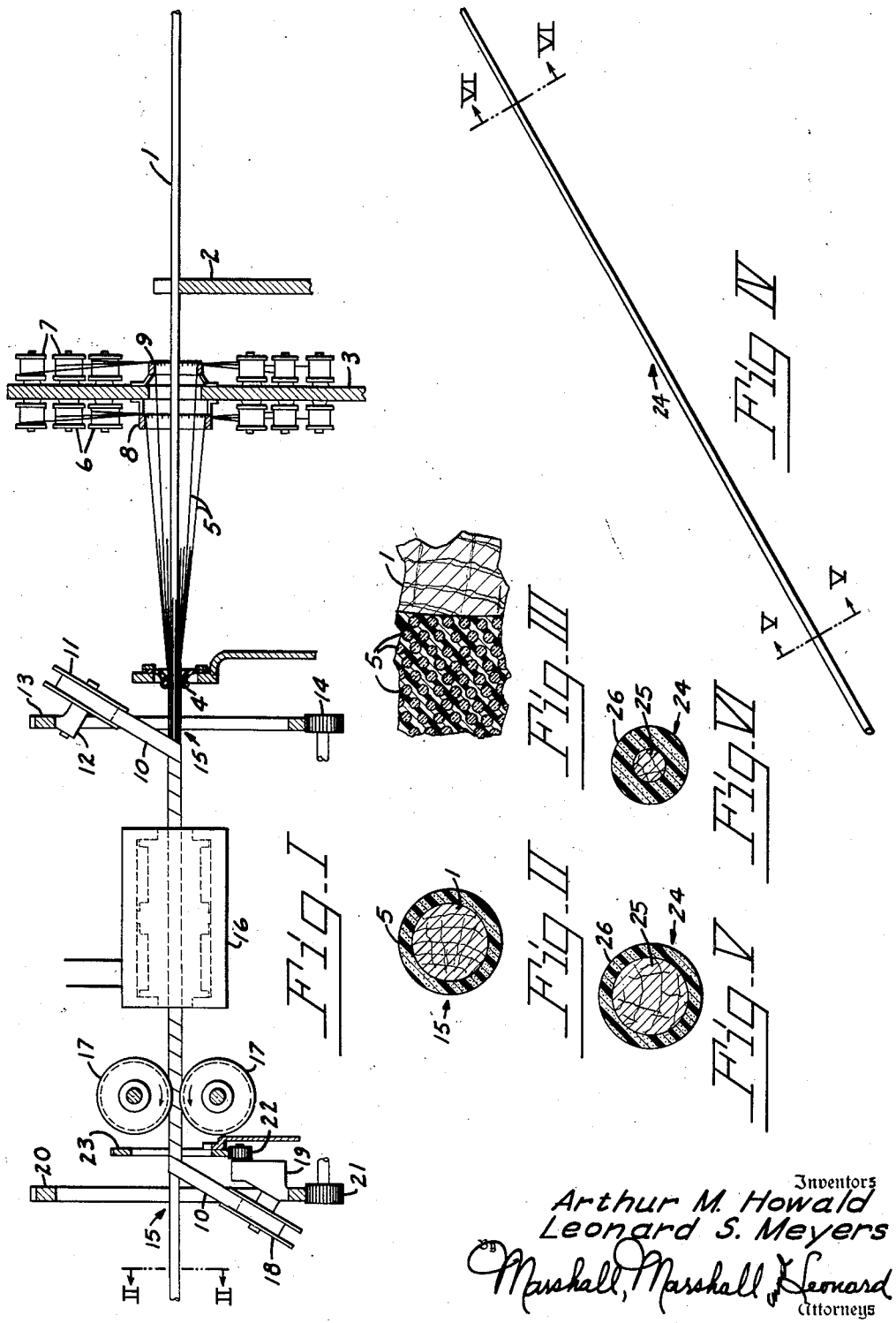
Inventors
Arthur M. Howald
Leonard S. Meyers
Marshall, Marshall & Leonard
Attorneys Patented Oct. 16, 1951

2,571,717

UNITED STATES PATENT OFFICE 2,571,717

SHAFT FOR FISHING RODS

Arthur M. Howald, Toledo, and Leonard S. Meyer, Newark, Ohio, assignors to Libbey-Owens-Ford Glass Company, Toledo, Ohio, a corporation of Ohio Application February 16, 1946, Serial No. 648,187

6 Claims. (Cl. 43—18)

1

This invention relates to the production of high strength lightweight shafts or rod-like materials which in various sizes may be used for fishing rods, ski poles, boats spars and other similar applications, and which are peculiarly effective for use as shafts for fishing rods.

Many rod-like materials whose use requires that they be light in weight but strong and resilient are made of bamboo or other light, stiff wood. Natural wood products tend to deteriorate when exposed to the weather and are limited in strength. For some applications natural bamboo is suitable, while for other applications, particularly for high quality flyrods, the bamboo must be split and the split sections assembled and bound together to produce a rod having the requisite strength and elasticity.

The principal object of this invention is to provide a rod-like material having great strength and resilience in proportion to its weight.

Another object is to provide a rod-like material of great strength and resilience which is not affected by exposure to the weather or to immersion in water.

Another object is to provide a rod-like material whose outer covering is stressed in tension parallel to the length of the rod.

A still further object is to provide a method of manufacture of high strength lightweight rod-like material.

More specific objects and advantages are apparent from the following description in which reference is made to the accompanying drawings.

According to the invention a rod-like material having strength in proportion to its weight is made by covering a core material with a skin of longitudinally extending high tensile strength fibers embedded in a matrix of a hard adhesive. The core material may be any light wood, hardened foamed resin, or any similar lightweight material which is strong in compression. The skin of the rod is formed of a plurality of high tensile strength glass fibers. The glass fiber material is embedded in a hard adhesive which bonds to the glass fiber material and to the core material. A polymerizable unsaturated polyester or a diallyl ester may be used as a hardenable adhesive. Resins of this type and which we have found to be particularly effective as binders for glass fibers in the practice of the instant invention are disclosed in United States Patents Nos. 2,462,042 to Arthur M. Howald et al.; 2,255,313 to Ellis; 2,388,319 to Fuller, and others.

In manufacturing the rod-like material the filaments are coated with the adhesive and are stretched longitudinally as they are placed in juxtaposed position and held in a bundle surrounding the surface of the core material while the adhesive hardens. The adhesive coated filaments are arranged in a uniform layer if the rod-like material is to have uniform strength in all directions.

A flyrod constructed by covering a core material with a layer of longitudinally tensioned resin bonded filaments has the balance and feel of a high quality bamboo rod and is very much superior to the bamboo rod in strength and resistance to water. In the construction of such a rod glass filaments or fibers having diameters of approximately 200 microinches and a tensile strength of approximately 300,000 pounds per square inch are used. Their modulus of elasticity is about one-third that of steel and their density is about one-third of that of steel. When the skin of the rod-like material is predominantly glass fiber with only sufficient hard adhesive to hold it in place the resulting rod is much stronger in proportion to its weight than a steel rod of the same size.

By selecting an adhesive which in its hard state is highly water resistant the coating of the rod is made immune to the effects of water, and the adhesive, by completely covering the core material, protects it from water. This improved property is of particular advantage in flyrods, ski poles and boat spars which are often immersed in water or are wet during use.

A method of manufacture and typical rods constructed according to the invention are illustrated in the accompanying drawings, in which:

Figure I schematically illustrates a method of constructing long rods of the improved form.

Figure II is a cross sectional view taken on the line II—II of Figure I, of one form of a completed rod embodying the invention.

Figure III is a greatly enlarged fragmentary cross section of the rod shown in Figure II.

Figure IV is a perspective view of a tapered rod having a tapered core.

Figure V is a cross sectional view of the large end of the rod as seen from the line V—V of Figure IV.

Figure VI is a cross sectional view of the small end of the rod, the section being taken along the line VI—VI of Figure IV.

These specific figures and the accompanying description are intended merely to illustrate the invention and not to impose limitations on the claims.

In the manufacture of long rods in a substantially continuous process according to the invention, rods 1 of a suitable core material are carried over a support 2 and through holes in a bobbin plate 3 and a bundling ring 4. A plurality of glass filaments or fibers 5 which have been previously coated with adhesive are drawn from bobbins 6 and 7 carried on the bobbin plate 3. The glass fibers 5 are drawn under tension through circular combs 8 and 9 and into the bundling ring 4 where they form a substantially uniform layer covering the core material 1. Immediately after passing the bundling ring 4 a binding tape 10 is spirally wound onto the rod and glass fibers to bind them into a compact bundle. The binding tape 10 is payed off a reel 11 carried on an inwardly directed bracket 12 of an annular gear 13. The gear 13 is driven by a pinion 14 whose speed is adjusted to the advance of the core material 1 and glass fibers 5 so that the binding tape 10 is spirally applied in a substantially continuous single layer. The core material 1 and the coated glass fibers 5 are thus assembled into a composite rod 15.

The rod 15, bound by the tape 10 is passed through an electrically heated oven 16 which serves to harden the adhesive coating on the glass fibers 5 so that the fibers are then embedded in a hard matrix of adhesive, bonding them to each other and to the core material 1. A pair of driving rolls 17 serve to draw the rod 15 through the oven and to deliver it from the mechanism. Immediately after passing the driving rolls 17 the binding tape 10 is unwound from the rod 15 and onto a reel 18 which is carried on an inwardly directed bracket 19 of an annular gear 20. The gear 20 is driven by a pinion 21 carried on the same shaft as the pinion 14. The annular gears 13 and 20 must operate at the same speed so that the one may unwrap the tape 10 from the rod 15 at the same speed as the other wraps it. The reel 18 is driven through a friction clutch and gearing contained within the bracket 19 from a pinion 22 meshing with a stationary gear 23. Thus the rotation of the annular gear 20 causes the reel 18 to turn and wind up the tape 10 as rapidly as it is unwound from the rod 15.

The binding tape 10 may be a steel ribbon or a cellophane strip, or other tough smooth material which will not bond to the adhesive coated on the glass fibers 5. Alternatively, binding tape which bonds to the adhesive may be used and left on the finished rod if such a tape is not objectionable in view of the intended use of the rod.

Figure II illustrates the cross sectional appearance of one form of a completed rod and shows a substantially uniform layer of adhesive coated glass surrounding the core material.

Figure III shows the general arrangement of the individual glass fibers in the layer and the proportion of glass to adhesive. Sufficient adhesive is employed so that each of the glass fibers is separated from its neighbors by a thin adhesive bond and the space between the fibers is completely filled with adhesive.

In general the function of the core material is to space the high strength material so as to increase the section modulus of the rod without materially increasing the content of heavy high strength material contained in the rod.

In order to achieve the proper "action" it is necessary, in a fishing rod, that the rod taper along its length. Figure IV shows a tapered rod 24 constructed according to one form of the invention. At its larger end, as seen in the section in Figure V, the rod comprises a core 25 made of wood and surrounded by a skin of longitudinally extending hard and tensioned glass fiber 26 embedded in a matrix of hard adhesive. The core material 25 is tapered along the length of the rod and may or may not extend to the end of the rod. In the event that the core material does not extend to the end of the rod the end section is similar in appearance to the remainder of the rod and the taper may continue to the end of the rod even though the core does not extend that far. As the core material is reduced in diameter and as a constant number of glass fibers are employed the skin becomes relatively thicker as well as representing an increased proportion of the cross sectional area. This is readily shown by comparing the cross-sections shown in Figures V and VI.

It may be desirable in some instances to maintain a substantially constant ratio between the core material and the skin of adhesive coated glass, or to maintain a constant thickness of adhesive coated glass. This may be accomplished in the formation of the tapered rod by starting the manufacture at the large end of the rod and as the construction proceeds toward the small end cutting out some of the fibers to reduce their number. The number of glass fibers so removed may be such that a constant skin thickness is maintained along the length of the tapered rod or such that a constant ratio of core material and skin is maintained.

The methods described for manufacturing the improved shafts for fishing rods are merely illustrative and may be modified as required by the specific details of various articles to be produced.

Having described the invention, we claim:

1. The method of producing a resilient tapered shaft for a fishing rod that consists in the steps of coating strands of glass fiber with a hardenable resinous adhesive, placing a plurality of the strands of fibers in longitudinal parallel arrangement with the fibers under tension, placing a rod of core material having substantial strength in compression in the midst of the tensioned strands, compressing the tensioned strands into a layer on the surface of the core material, eliminating some of the strands along part of the length of the shaft to regulate the ratio of core to fiber and to taper the shaft, and carrying out the hardening of the adhesive.

2. A fishing rod comprising a plurality of glass fibers extending longitudinally along the axis of the rod and embedded in a hard resinous adhesive, said fibers being secured in closely assembled relation and maintained in their longitudinally extending relation throughout their lengths by said adhesive, and a core of lightweight material having a high resistance to lateral compression, extending centrally and longitudinally along the axis of the rod, said fibers surrounding said central core and completely enclosing the same, and said fibers being less in number at one end of the rod than at the other end and defining with said central core a tapered body.

3. A fishing rod comprising a plurality of glass fibers extending longitudinally along the axis of the rod and embedded in a hard resinous adhesive, said fibers being secured in closely assembled relation and maintained in their longitudinally extending relation throughout their lengths by said adhesive, and a tapered core of lightweight material having a high resistance to lateral compression, extending centrally and longitudinally along the axis of the rod, said fibers surrounding said central core and completely enclosing the same, and said fibers defining with said central core a tapered body.

4. A method of producing a tapered shaft for a fishing rod that comprises the steps of coating strands of glass fiber with a hardenable resinous adhesive and placing a plurality of the strands in longitudinally extending arrangement under tension, with a tapered rod of core material having substantial strength in compression in the midst of the tensioned strands, compressing the tensioned strands into a layer on the surface of the core material, and carrying out the hardening of the adhesive.

5. A fishing rod as claimed in claim 2 wherein the adhesive is a hardened polymerizable unsaturated polyester.

6. A fishing rod as claimed in claim 3 wherein the adhesive is a hardened polymerizable unsaturated polyester.

ARTHUR M. HOWALD.
LEONARD S. MEYER.

REFERENCES CITED

The following references are of record in the file of this patent:

UNITED STATES PATENTS

| Number | Name | Date |
|---|---|---|
| 103,467 | Hull | May 24, 1870 |
| 112,891 | Bohler | Mar. 21, 1871 |
| 244,619 | King | July 19, 1881 |
| 263,098 | Barstow | Aug. 22, 1882 |
| 285,673 | Phillips | Sept. 25, 1883 |
| 386,321 | Horton | July 17, 1888 |
| 1,203,896 | Morris | Nov. 7, 1916 |
| 1,323,039 | Frederick | Nov. 25, 1919 |
| 1,520,342 | Grabau | Dec. 23, 1924 |
| 2,093,206 | Muller | Sept. 14, 1937 |
| 2,196,033 | Schumann | Apr. 2, 1940 |
| 2,207,157 | Neville | July 9, 1940 |
| 2,210,432 | Roesch | Aug. 6, 1940 |
| 2,227,931 | Greenleaf | Jan. 17, 1941 |
| 2,285,031 | Hickman | June 2, 1942 |
| 2,293,918 | Plainol | Aug. 25, 1942 |
| 2,311,704 | Simison | Feb. 23, 1943 |
| 2,339,431 | Slayter | Jan. 18, 1944 |
| 2,344,733 | Ripper | Mar. 21, 1944 |
| 2,390,039 | Slayter | Nov. 27, 1945 |
| 2,392,805 | Biefeld | Jan. 15, 1946 |
| 2,409,633 | Kropa | Oct. 22, 1946 |

FOREIGN PATENTS

| Number | Country | Date |
|---|---|---|
| 3,632 | Great Britain | 1883 |
| 490,935 | Great Britain | Aug. 23, 1938 |
| 534,928 | Great Britain | Mar. 24, 1941 |
| 551,820 | France | Apr. 14 1933 |